United States Patent [19]

Sasamoto et al.

[11] Patent Number: 4,889,742
[45] Date of Patent: Dec. 26, 1989

[54] LOBSTER-LIKE FOOD PRODUCT AND A PROCESS FOR PRODUCING THE SAME

[75] Inventors: Yasuhiko Sasamoto; Shusaku Hasegawa; Atsushi Okazaki, all of Tokyo, Japan

[73] Assignee: Taiyo Fishery Co., Ltd., Tokyo, Japan

[21] Appl. No.: 131,282

[22] Filed: Dec. 10, 1987

Related U.S. Application Data

[63] Continuation of Ser. No. 821,092, Jan. 21, 1986, abandoned.

[30] Foreign Application Priority Data

| Jan. 28, 1985 [JP] | Japan | 60-10422 |
| Feb. 1, 1985 [JP] | Japan | 60-13146 |
| Mar. 6, 1985 [JP] | Japan | 60-31779 |
| Mar. 6, 1985 [JP] | Japan | 60-31781 |

[51] Int. Cl.⁴ .................. A22C 25/00; A22C 25/20; A23L 1/325; A23L 1/33
[52] U.S. Cl. ........................ 426/643; 426/513; 426/802
[58] Field of Search ............ 426/92, 104, 297, 512, 426/643, 513, 802

[56] References Cited

U.S. PATENT DOCUMENTS

| 3,358,588 | 12/1967 | Rossnan | 426/513 X |
| 4,000,323 | 12/1976 | Youngquist | 426/104 X |
| 4,285,980 | 8/1981 | Lewis | 426/513 X |
| 4,303,688 | 12/1981 | Shimura et al. | 426/513 |
| 4,423,083 | 12/1983 | Shenouda | 426/574 |
| 4,540,589 | 9/1985 | Rachi et al. | 426/802 X |
| 4,559,236 | 12/1985 | Okada | 426/513 X |
| 4,751,096 | 6/1988 | Nada et al. | 426/104 |

FOREIGN PATENT DOCUMENTS

57-15670  4/1982  Japan .................. 426/643

Primary Examiner—Steve Alvo
Attorney, Agent, or Firm—Kanesaka and Takeuchi

[57] ABSTRACT

A lobster-like or crab leg-like food product comprising a muscle imitation part and an outer shell imitation part which envelops said muscle imitation part to be integrated therewith. The process for producing the lobster-like or crab leg-like food product comprises using a pair of molds each having a concave on which is curved an outer shell shape of lobster abdomen having plural segments or an outer shell shape of crab leg.

4 Claims, 4 Drawing Sheets

LOBSTER-LIKE FOOD PRODUCT AND A PROCESS FOR PRODUCING THE SAME

This application is continuation, of application Ser. No. 821,092, filed Jan. 21, 1986.

BACKGROUND OF THE INVENTION

1. Field of the Invention

This invention relates to a lobster-like or crab leg-like food product which is made of a fish meat paste product such as Kamaboko (a fish meat paste product popular in Japan) and has a taste, shape and color guite similar to the meat in the abdomen of real lobster or in the cheliped (chela leg) or the ambulatory leg of real crab.

2. Description of the Prior Art

Crab leg meat imitation products have hitherto proposed which are produced by bundling fibrous fine cut pieces of a fish meat paste product or by mixing said fibrous fine cut pieces with a pasty ground fish meat followed by heat-coagulation. Japanese Utility Model Laid-Open Nos. 11690/1984 and 38787/1984 propose various simulated crab leg products including not only a muscle imitation part but also an outer shell imitation part.

However, the above mentioned simulated crab leg products have outer appearance of crab leg and therefore no special consideration has been paid to the fact that a taste and texture are greatly influenced by not only senses of taste, smell and touch but also sense of sight.

The crab leg imitation food product disclosed in Japanese Utility Model Laid-Open No. 11690/1984 uses the ambulatory leg shell of real crab. Therefore, this imitation food product contains a non-edible portion. Moreover, the structure of the crab ambulatory leg meat imitation part in this crab leg imitation food products is entirely different from the muscle fiber structure in real crab ambulatory leg, and therefore said imitation food product has a taste and texture guite distant from those specific to the crab ambulatory leg in respect to senses of sight and touch.

The crab leg imitation food product disclosed in Japanese Utility Model Laid-Open No. 38787/184 has a shape of crab cheliped consisting of ductylus (movable finger) and propodus (pulm) and contains an edible part therein. Said edible part is composed by mixing fibrous fine cut pieces of a fish meat paste product with a pasty ground fish meat. Therefore, there exists no directiveness of fibrous fine cut pieces, resulting in a taste and texture, sense of touch, and shape of the end portion thereof which, when eaten, are rather different from those of real crab cheliped.

Further there exists no lobster-like food product which copies the outer appearance, taste, texture, etc. of a crayfish, American lobster and the like which are known genericically as a lobster.

SUMMARY OF THE INVENTION

Accordingly, the main object of the present invention is to provide a lobster-like or crab leg-like food product and a process for producing the same, said lobster-like or crab leg-like food product (i) being wholly edible, (ii) having an outer appearance which is quite similar to that of the abdomen of real lobster or of the cheliped or ambulatory leg of real crab, and (iii) closely resembling the abdomen of real lobster or of the chela leg or ambulatory leg of real crab in respect to a taste and texture, a sense of touch, and a shape of the end portion thereof when eaten.

Other objects and further scope of applicability of the present invention will become apparent from the detailed description given hereinafter. It should be understood however, that the detailed description and specific examples, while indicating preferred embodiments of the invention, are given by way of illustration only, since various changes and modifications within the sprit and scope of the invention will become apparent to those skilled in the art from this detailed description.

According to the present invention, said object is achieved by a lobster-like food product comprising a muscle imitation part and an outer shell imitation part which envelops said muscle imitation part to be integrated therewith; said muscle imitation part is composed of one or more united fibrous fish meat paste products, each of which is made into a bundled form of plural pieces of fibrous material; and said outer shell imitation part is made from a heat-coagulated material of a pasty ground fish meat to imitate an outer shell shape of lobster abdomen having plural segments (abdominal segment).

Further according to the present invention, said object is achieved by a crab-like food product comprising a muscle imitation part and an outer shell imitation part which envelops said muscle imitation part to be integrated therewith; said muscle imitation part is composed of one or more united fibrous fish meat paste products, each of which is made into a bundled form of plural pieces of fibrous material; and said outer shell imitation part is made from a heat-coagulated product of a pasty ground fish meat to imitate an outer shell shape of crab leg.

Further the present invention provides a process for producing a lobster-like food product using a pair of molds each having a concave on which is curved an outer shell shape of lobster abdomen having plural segments, which comprises the steps of (i) filling a prescribed amount of a pasty ground fish meat into one of said concaves;

(ii) placing onto said pasty ground fish meat one or more united fibrous fish meat paste products, each of which is made into a bundled from of plural pieces of fibrous material;

(iii) filling a prescribed amount of a pasty ground fish meat into another concave or coating a prescribed amount of a pasty ground fish meat onto said united fibrous fish meat paste products placed onto said pasty ground fish meat in step (ii);

(iv) joining together a pair of molds to presscontact said united fibrous fish meat paste products with said pasty ground fish meat so that the latter envelops the former; and (v) heat-coagulating said fibrous fish meat paste products and said pasty ground fish meat enveloping said united fibrous fish meat paste products to integrate the former with the latter.

Further the present invention provides a process for producing a crab leg-like food product in the same manner as in the above mentioned process for producing a lobster-like food product except that the molds used in said process for the production of lobster-like food product are replaced by a pair of molds each having a concave on which is curved an outer shell shape of crab leg

BRIEF DESCRIPTION OF THE DRAWINGS

The present invention will become more fully understood from the detailed description given hereinbelow and accompanying drawings which are given by way of illustration only, and thus not limitative of the present invention, and wherein.

DETAILED DESCRIPTION OF THE PREFERRED EMBODIMENT

Figure 1:
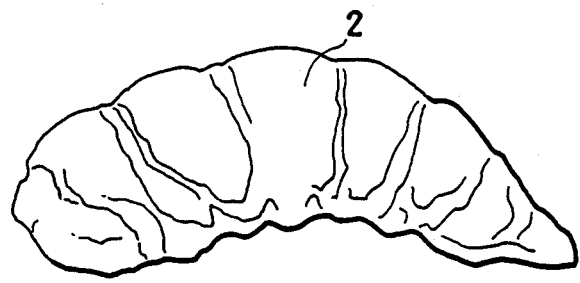
FIG. 1 is a perspective view of one embodiment of the lobster-like food product according to the present invention.
Figure 2:
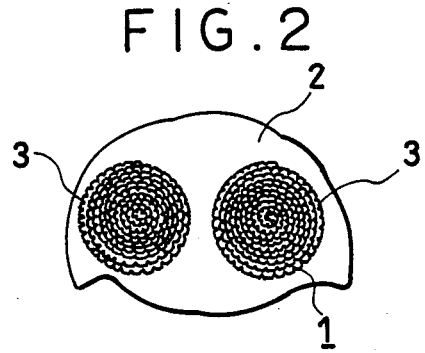
FIG. 2 is a side view of said lobster-like food product of FIG. 1 seen from the longitudinal direction thereof.
Figure 3:
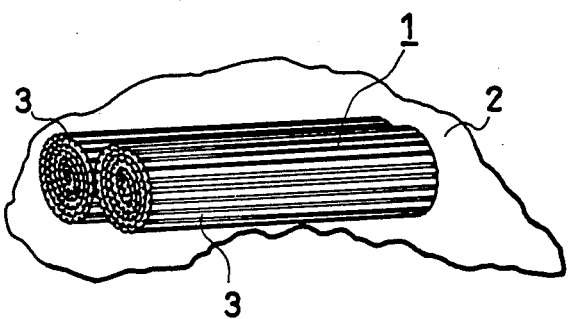
FIG. 3 is a perspective drawing of said lobster-like food product of FIG. 1 seen from a direction perpendicular to the longitudinal direction thereof.

Referring to the drawings, there are hereinafter explained the preferred embodiments of a lobster-like or crab leg-like food product according to the present invention. FIGS. 1-3 show one embodiment of the lobster-like food product according to the present invention. The lobster-like food product of this embodiment is composed of a muscle imitation part 1 and an outer shell imitation part 2 which envelops said muscle imitation part 1 to be integrated therewith. Said muscle imitation part 1 is composed by arranging a pair of united fibrous fish meat paste products 3 along a longitudinal direction of the outer shell imitation part 2, said united fibrous fish meat paste product 3 being made into a bundled form of plural pieces of fibrous material. Said outer shell imitation part 2 is prepared from a heat-coagulated material of a pasty ground fish meat to imitate an outer shell shape of lobster abdomen having plural segments.

It is preferable that each united fibrous fish meat paste product 3 constituting said muscle imitation part 1 is seasoned with a flavor or savor of lobster by use of lobster extract and that a color of real lobster abdomen is given onto said united fibrous fish meat paste product 3. In the production of the united fibrous fish meat paste product 3, a meat of real lobster abdomen may be mixed therewith. By mixing the meat of real lobster abdomen, the taste and texture as well as the flavor or savor of the lobster-like food product according to the present invention become more resembling those of real lobster.

Not only in the case of the lobster-like food product but also in the case of a crab leg-like food product which will be mentioned later, said muscle imitation part 1 may be composed of one united fibrous fish meat paste product 3, but it is more preferable that it is composed of two or more united fibrous fish meat paste products 3 arranged so that they are adjacent to each other. When plural united fibrous fish meat pasty products 3 are used for the muscle imitation part 1, they may be arranged so that their fiber directions are in parallel with each other. Alternately they may be arranged in such a manner that at least one of them has a fiber direction which is different from those of the others. In the case of the crab leg-like food product mentioned below, the latter arrangement is preferable, whereas in the case of the lobster-like food product, the former arrangement is preferable. Further, in the lobster-like food product, it is preferable to arrange each united fibrous fish meat paste product 3 in such a manner that its fiber direction parallels the longitudinal direction of the outer shell imitation part 2. Furthermore, in the lobster-like food product, it is preferable that each united fibrous fish meat paste product 3 is arranged to be located in one or more segments of the outer shell imitation part 2.

Although said outer shell imitation part 2 may be made of a heat-coagulated product of a pasty ground fish meat alone, it is preferable to add fibrous fine cut pieces of a fish meat paste product to said heat-coagulated product of the pasty ground fish meat and thereafter heat-coagulate then mixture. It is more preferable that the heat-coagulated product has been seasoned with a flavor or savor of real lobster abdomen meat; has been colored with a color of real lobster abdomen, or has been mixed with a meat of real lobster abdomen.

Figure 4:
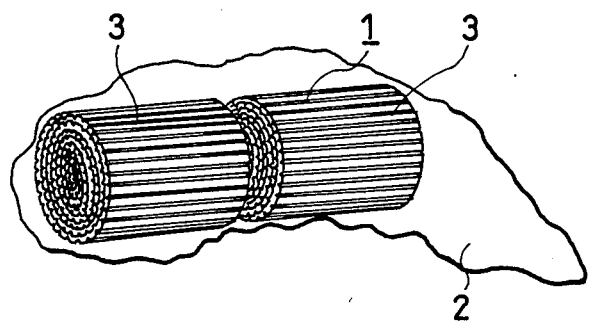
FIG. 4 is a perspective drawing of another embodiment of the lobster-like food product according to the present invention seen from a direction perpendicular to the longitudinal direction thereof.

FIG. 4 shows a perspective drawing of another embodiment of the lobster-like food product according to the present invention. The lobster-like food product of this embodiment is composed by arranging two united fibrous fish meat paste products 3 which have a larger diameter and shorter length than the united fibrous fish meat paste product 3 used in the lobster-like food product of the former embodiment in such a manner that each united fibrous fish meat paste product 3 exists in every two segments of the outer shell imitation part 2. Although a slender shape similar to the united fibrous fish meat paste product used in the former embodiment is breakable, the united fibrous fish meat paste product 3 used in this embodiment is made in a more easily breakable form than that used in the former embodiment.

Figure 5:
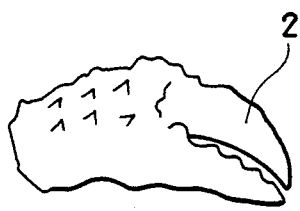
FIG. 5 is a perspective view of one embodiment of a crab cheliped-like food product of the crab leg-like food product according to the present invention.
Figure 6:
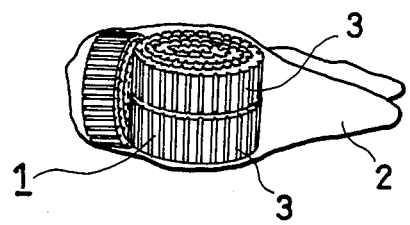
FIG. 6 is a perspective drawing of the crab cheliped-like food product of FIG. 5.

FIGS. 5 and 6 show one embodiment of the crab cheliped-like food product according to the present invention. Like the above mentioned lobster-like food product, the outer shell imitation part 2 in the crab cheliped-like food product of this embodiment is composed of a heat-coagulated material of a pasty ground fish meat. However, unlike the above mentioned lobster-like food product, the outer shell imitation part 2 in this embodiment has an outer shell shape of crab cheliped consisting of propodus (pulm) and dactylus (movable finger). Like the lobster-like food product, the muscle imitation part 1 in this embodiment is composed of plural united fibrous fish meat paste product 3. However in this embodiment there are used three united fibrous fish meat paste products 3 each having a flatter shape than that used in the lobster-like food product. The three united fibrous fish meat paste products have almost the same size. One of them is arranged in such a manner that its fiber direction differs from the fiber directions of the remaining two. By arranging plural united fibrous fish meat paste products 3 in different fiber directions, the muscle imitation part 2 has a texture more resembling that of real crab cheliped having different muscle fiber structures in different regions.

It is preferable that said united fibrous fish meat paste product 3 has been seasoned with a flavor or savor of crab meat by use of crab met extract, has been colored with a color of crab meat, or has been mixed with real crab meat. It is preferable that the heat-coagulated material for the outer shell imitation part 2 has been mixed with fibrous fine cut pieces of a fish meat paste product; has been seasoned with a flavor or savor of crab meat; has been colored with a color of crab meat; or has been mixed with real crab meat. These can be applied not only to the crab cheliped-like food product but also a crab ambulatory leg-like food product mentioned below.

Figure 7:
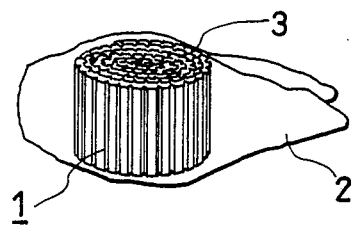
FIG. 7 is a perspective drawing of another embodiment of the crab cheliped-like food product according to the present invention.
Figure 8:
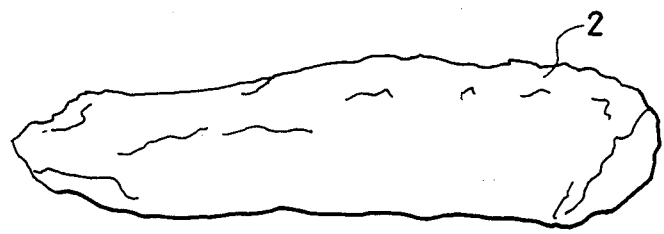
FIG. 8 is a perspective view of one embodiment of a crab ambulatory leg-like food product of the crab leg-like food product according to the present invention.
Figure 9:
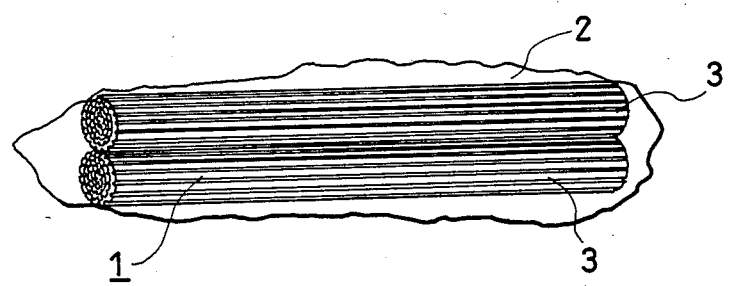
FIG. 9 is a perspective drawing of said crab ambulatory leg-like food product of FIG. 8.

FIG. 7 shows a perspective drawing of another embodiment of the crab cheliped-like food product according to the present invention. The muscle imitation part 1 in the crab cheliped-like food product of this embodiment is composed by arranging one united fibrous fish meat paste product 3 having a cylindrical shape which is longer than the united fibrous fish meat paste product 3 used in the last mentioned embodiment. The fiber direction of the united fibrous fish meat paste product 3 is different from the longitudinal direction of the outer shell imitation part 2. FIGS. 8 and 9 show one embodiment of the crab ambulatory leg-like food product according to the present invention. In the crab ambulatory leg-like food product of this embodiment, the outer shell imitation part 2 comprises a heat-coagulated material of a pasty ground fish meat and has a outer shell shape of crab ambulatory leg. The muscle imitation part 1 is composed by arranging a pair of the upper and the lower united fibrous fish meat paste products 3 in such a manner that their fiber directions parallel the longitudinal direction of the outer shell imitation part 2.

Figure 10:
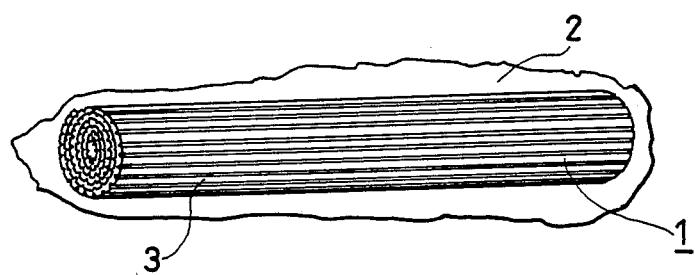
FIG. 10 is a perspective drawing of another embodiment of the crab ambulatory leg-like food product according to the present invention.

FIG. 10 shows another embodiment of the crab ambulatory leg-like food product according to the present invention. The muscle imitation part 1 in this embodiment is composed by arranging one united fibrous fish meat paste product 3 having a larger diameter than the united fibrous fish meat paste product 3 used in the last mentioned embodiment in such a manner that its fiber direction parallels the longitudinal direction of the outer shell imitation part 2.

Hereunder is explained a process for producing the above mentioned lobster-like or crab leg-like food product and additionally the above mentioned lobster-like or crab leg-like food product is further explained in detail.

Figure 11:
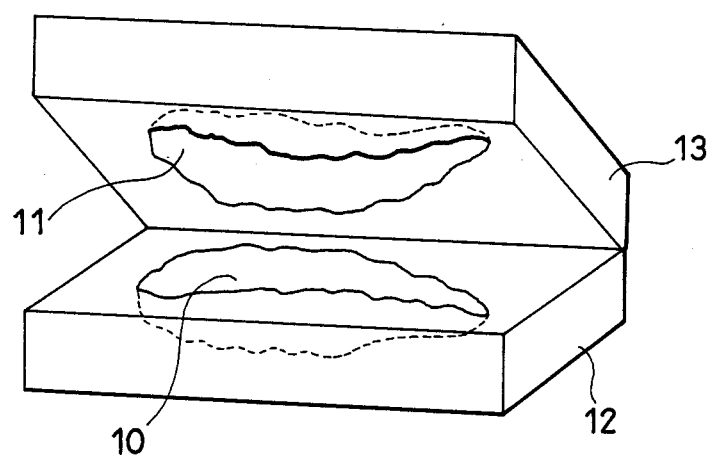
FIG. 11 is a perspective view of a pair of molds used for the production of the lobster-like food products shown in FIG. 1 and FIG. 4.

First, a process for producing the lobster-like food product of the present invention is explained. In practicing the process, as is shown in FIG. 11, there are previously provided with a pair of molds 12 and 13 having respective concaves 10 and 11 on which is curved an outer shell shape of lobster abdomen having plural segments. It is preferable that the size and shape of the concaves 10 and 11 are determined in view of the size and shape of real lobster.

In the production of the lobster-like food product, a prescribed amount of pasty ground fish meat is first filled into one of said concaves 10 and 11 (the step (i) mentioned above). As the pasty ground fish meat, there are exemplified those used for the conventional production of Kamaboko. To excessively fill the pasty ground fish meat into the concave does not produce any inconvenience, because an excessive amount thereof will overflow the molds when a pair of molds are joined together to press-contact the contents. It is preferable that the pasty ground fish meat has been mixed with fibrous fine cut pieces of a fish meat paste product. As the fibrous fine cut pieces of the fish meat paste product, there can be preferably used those obtained by shaping and smothering a pasty ground fish meat in accordance with the conventional Kamaboko producing process to form a sheet material and finely cutting it into a fibrous form. The preferable fibrous fine cut pieces of the fish meat paste product has a diameter of 0.5 to 3 mm and a length of 5 to 50 mm. The preferable amount of the fibrous fine cut pieces of the fish meat paste product added is 50 to 150 parts by weight relative to 100 parts by weight of the pasty ground fish meat. Real lobster meat can be added to the pasty ground fish meat to give a more preferable flavor or savor and texture of lobster to the lobster-like food product. In order to give a flavor or savor of lobster, lobster extract may be added to the pasty ground fish meat.

Next, one or more united fibrous fish meat paste products 3, each of which is made into a bundled form of plural pieces of fibrous material, are placed onto said pasty ground fish meat (the step (ii) mentioned above). As the united fibrous fish meat paste product, there are exemplified those obtained by shaping and smothering a pasty ground fish meat in accordance with the conventional Kamaboko producing process to form a sheet material; making cuts thereon in a prescribed distance (interval) in the longitudinal direction thereof to such an extent that the sheet material is not cut into pieces; and rolling the sheet material with cuts toward the longitudinal direction thereof. The preferable thickness and width of said sheet material are 1 to 30 mm and 150 to 300 mm, respectively. The preferable interval between the cuts and depth of each cut is 1 to 3 mm and 0.5 to 2.5 mm, respectively. It is necessary that the united fibrous fish meat paste product 3 has a length shorter than the longitudinal length of the concave 10 or 11. Usually the length thereof in the longitudinal direction is 10 to 150 mm and the width (diameter) thereof is 10 to 50 mm. As the united fibrous fish meat paste product 3, there can be also used those obtained by finelly cutting said sheet material to obtain fibrous fine cut pieces of the fish meat paste product and bundling said fibrous fine cut pieces together with a pasty ground fish meat as a binding meat. In this case, the preferable diameter and length of said fine cut pieces are 1 to 3 mm and 10 to 100 mm. It is a matter of course that the united fibrous fish meat paste product 3 is not limited to those obtained by the above mentioned two methods. However, the former production method is superior to the latter production method in terms of operation efficiency. It is preferable that the united fibrous fish meat paste product 3 has been seasoned with a flavor or savor of lobster meat by use of lobster extract or the like; has been colored with a nontoxic colorant to give a color of lobster meat thereto; or has been mixed with real lobster meat. In the placement of the united fibrous fish meat paste products 3 onto the pasty ground fish meat, the number and direction thereof to be placed are not limited. However, in case of the lobster-like food product, it is preferable that one or more united fibrous fush meat paste products 3 are placed on said pasty ground fish meat in such a manner that the fiber directions thereof parallel the longitudinal direction of said concave 10. Preferably, each united fibrous fish meat paste product 3 is arranged along the longitudinal direction of said concave 10 to be located on one or two simulated segments on said concave 10.

Next, a prescribed amount of a pasty ground fish meat is coated onto said united fibrous fish meat paste product 3 placed on the concave 10 (the step (iii) mentioned above). As the pasty ground fish meat, there is preferably used the same material as the pasty ground fish meat filled into the concave 10 in step (i). The amount of the pasty ground fish meat coated onto the united fibrous fish meat paste products 3 in this step (iii) is such an amount that the total volume of the pasty ground fish meat filled into the concave 10 in step (i), the united fibrous fish meat paste products 3 placed onto said pasty ground fish meat in step (ii) and the pasty ground fish meat coated on the united fibrous fish meat paste products 3 in step (iii) is identical to or greater than the inner volume of the concaves 10 and 11. Preferably the amount of the pasty ground fish meat used in step (iii) is identical to the amount of the pasty ground fish meat used in step (i). In place of coating the pasty ground fish meat onto the united fibrous fish meat paste products, a prescribed amount of a pasty ground fish meat may be filled into another concave 11. In this case, the pasty ground fish meat may be filled into the concave 10 prior to conducting step (i) or step (ii).

Next, a pair of molds 12 and 13 are joined together to press-contact said united fibrous fish meat paste products 3 with said pasty ground fish meat so that the latter envelops the former (step (iv) mentioned above).

Next, said united fibrous fish meat paste products 3 and said pasty ground fish meat enveloping said united fibrous fish meat paste products 3 are heat-coagulated to integrated the former with the latter (step (v) mentioned above). The heating may be conducted by smothering or roasting. When the heating is conducted by smothering, the preferable temperature and time thereof are 60° to 100° C. and 2 to 40 minutes, respectively.

Thereafter an outer shell color of lobster abdomen is preferably given to the surface of the heat-coagulated pasty ground fish meat. A non-toxic known colorant can be used for the coloration. If necessary, heating by smothering or roasting may be conducted for heat-sterilization after the coloring step. When the heating is conducted by smothering, the preferable temperature and time thereof are 90° to 95° C. and 20 to 30 minutes, respectively.

The process for producing a crab leg-like food product such as crab cheliped-like and crab ambulatory leg-like food product can be conducted in the same manner as in the above mentioned process for producing a lobster-like food product except that there are used a pair of molds each having a concave on which is curved an outer shell shape of crab cheliped or crab ambulatory leg. Further the process for producing a crab leg-like food product is different from the process for producing a lobster-like food product in that a flavor or savor and a color of crab meat may be applied instead of a flavor or savor and a color of lobster meat and that crab meat may be mixed instead of lobster meat. Further the size of the united fibrous fish meat paste product used in the crab cheliped-like food product is limited in its maximum length, because the crab cheliped-like food product itself is small.

Referring to Example, the process of the present invention will be hereunder explained more concretely.

EXAMPLE 1

A pair of molds 12 and 13 as illustrated in FIG. 11 were previously provided. The molds have respective concaves 10 and 11 on which was curved an outer shell shape of lobster abdomen having plural segments. The size and shape of the concaves 10 and 11 were the same as those of real lobster. The inner volumes of the concaves 11 and 11 are each 80 $cm^3$.

First 50 $cm^3$ of a pasty ground fish meat was filled in a uniform thickness into said concave 10. The pasty ground fish meat was previously seasoned with a flavor or savor of lobster meat by using a small amount of lobster extract. To the pasty ground fish meat was previously added a fibrous fine cut pieces of a fish meat paste product in a proportion of 100 parts by weight of the former to 120 parts by weight of the latter. The diameter and the length of the fibrous fine cut pieces are 1 mm and 20 mm, respectively.

Next, two united fibrous fish meat paste products 3, each of which was a bundled form of plural pieces of fibrous material, were placed on said pasty ground fish meat filled into the concave 10 in their arrangement as illustrated in FIGS. 2 and 3. The united fibrous fish meat paste product 3 used was prepared by shaping and smothering a pasty ground fish meat in accordance with a conventional Kamaboko production process to obtain a sheet material (thickness 1.5 mm), said pasty ground fish meat being previously seasoned with a flavor or savor of lobster meat by use of a small amount of lobster meat; making cuts having a depth of 1 mm thereon in a distance (interval) of 1.5 mm in the longitudinal direction thereof to such and extend that the sheet material is not cut into pieces; an rolling the sheet material with cuts toward the longitudinal direction thereof. The diameter and the length of the united fibrous fish meat paste product 3 are 20 mm and 60 mm, respectively.

Next, 62 $cm^3$ of a pasty ground fish meat was coated in a uniform thickness onto said united fibrous fish meat paste product 3 placed on said concave 10. The pasty ground fish meat used here was the same material as that filled into the concave 10.

Next, a pair of molds 12 and 13 were joined together to press-contact said united fibrous fish meat paste products 3 with said pasty ground fish meat so that the latter envelops the former.

Next, said united fibrous fish meat paste products 3 and said pasty ground fish meat enveloping said united fibrous fish meat paste products 3 were smothered at 90° C. for 30 minutes to integrate the former with the latter.

Thereafter, an outer shell color of lobster abdomen was given on the surface of the heat-coagulated pasty ground fish.

The lobster-like food product thus obtained was an imitation food product (i) being wholly edible, (ii) having an outer appearance quite similar to that of the abdomen of real lobster, as shown in FIGS. 1-3, and (iii) closely resembling the abdomen of real lobster (having directiveness of the muscles in different regions) in respect to a taste and texture, a sense of touch, and a shape of the end portion thereof when eaten.

It will be obvious to those skilled in the art that many modifications may be made within the scope of the present invention without departing from the spirit thereof, and the invention includes all such modifications.

What is claimed is:

1. A lobster-like food product comprising:

two elongated imitation muscles arranged parallel to each other and extending over a substantial portion of the food product along the longitudinal direction thereof, each imitation muscle having a plurality of fibers arranged to extend in the same direction and bonded together to form a bundle of fibers, each imitation muscle being prepared by heat-coagulating a fish paste, at least partly cutting the heat-coagulated fish paste to form a plurality of attached fibers and assembling the fibers to form a bundle, and an imitation outer shell having a shape imitating the outer shell of a lobster abdomen having plural segments, said outer shell enveloping said two imitation muscles to be embedded in the imitation outer shell parallel to each other so that their fiber directions are parallel to the longitudinal direction of the imitation outer shell, said outer shell being made from heat-coagulated ground fish and integrally bonded to the imitation muscles to thereby provide an appearance that the imitation muscles are embedded inside the outer shell, wherein the food product having the imitation muscles and outer shell similar to the actual lobster tail is obtained.

2. A process for producing an imitation food product comprising:

preparing at least one imitation muscle by shaping a fish paste into a sheet form, smothering the fish paste to form a heat-coagulated fish material, at least partly cutting the fish material to form a plurality of fibers, and assembling the fibers to form a bundle of fibers, filling a sufficient amount of fresh ground fish into a concave of one of two molds, placing at least one imitation muscle onto the fresh fish ground fish in the mold along a longitudinal direction of the food product, said imitation muscle extending over a substantial portion of the concave, covering the imitation muscle by fresh ground fish by either (a) filling a sufficient amount of fresh ground fish into a concave of the other of the two molds or (b) coating a sufficient amount of fresh ground fish onto and around the imitation muscle; and then joining the two molds together so that the imitation muscle is retained inside the fresh ground fish to extend over the substantial portion of the food product and the ground fish is shaped in the form of the concaves of the mold, and heat-coagulating the fresh ground fish together with the imitation muscle to integrally connect together to thereby provide an appearance that the imitation muscle is embedded inside the outer shell, wherein the food product having the imitation muscle and outer shell similar to an actual food product is formed.

3. A process according to claim 2, further comprising applying a color additive to an outer surface of the heat-coagulated fish having the imitation muscle therein.

4. A process according to claim 3, in which said fish paste and ground fish are seasoned with a flavor additive.

* * * * *